Patented Oct. 20, 1953

2,656,371

UNITED STATES PATENT OFFICE 2,656,371

SELECTIVE REDUCTION OF FATTY ACIDS

William S. Baldwin, St. Paul, and Don E. Floyd, Robbinsdale, Minn., assignors to General Mills, Inc., a corporation of Delaware No Drawing. Application April 28, 1952, Serial No. 284,828

8 Claims. (Cl. 260—409)

The present invention relates to a process of producing mono-olefinic acids from poly-olefinic acids by reduction in the presence of a hydrogen donor. The process is particularly adapted to the production of oleic acids from polyunsaturated $C_{18}$ acids.

Oleic acid is a valuble item of commerce. It is widely used in soaps, textile-treating agents, synthetic detergents, and emulsifying agents. It is also used as a raw material for the manufacture of plasticizers, detergents, dibasic acids, surface coatings, and many other products. The demand for it is such that it commands a price higher than do many other fatty acids.

The principal desirable characteristics of oleic acid are its low melting point and its stability. The saturated acids melt higher than does oleic acid, while the highly unsaturated acids are unstable to heat and air. Since many liquid chemicals are customarily stored in outdoor tanks it is often desired that they do not freeze (solidify) at temperatures to be encountered on storage, or if they do solidify that they can easily be remelted on application of mild heating. It is a difficult matter to melt several thousand gallons of hard, solid fatty acid. Oleic acid is one of the few relatively stable fatty acids that has a low melting point. In general, this also follows for its derivatives.

Polyunsaturated fatty acids are unstable to light and air. They oxidize and polymerize, so that rancid, objectionable odors develop and increases in viscosity occur. Oleic acid is much more stable, although it will become rancid to a lesser extent. However, it is more resistant to oxidation and it is very resistant to polymerization.

The two most widely practiced methods of producing oleic acid on a commercial scale are the low-temperature pressing of tallow and the thermal polymerization of mixture containing oleic acid and polyunsaturated acids, followed by stripping unreacted oleic acid from the polymer. Both of these methods, with or without additional processing, as by distillation or crystallization, are cumbersome and expensive. Furthermore, they do not yield oleic acid as free of polyunsaturated acids as desired. Nevertheless, the demand for oleic acid is great enough that extensive commercial use is made of the two procedures.

Many prior attempts have been made to reduce polyunsaturated fatty acids to oleic acid and to minimize the formation of saturated acids. These attempts have, in general, been made through the hydrogenation of fatty acids or oils in the presence of hydrogen and a hydrogenation catalyst. These attempts have met with only partial success; when hydrogenation was allowed to proceed to the point where the polyunsaturated fatty acids had been used up, substantial quantities of saturated fatty acids were formed, while when the hydrogenation was stopped before much of the saturated acids were formed, substantial amounts of polyunsaturated acids were left unchanged.

In contrast to these prior methods the present process makes possible the production of a material rich in oleic acid and substantially free from polyunsaturated acids. In addition the quantity of saturated acids formed in the product may be kept at a very low level. If desired, the small quantity of saturated fatty acids may be removed by any simple method such as by crystallization, etc.

It is, therefore, an object of the present invention to provide a novel process of producing mono-olefinic fatty acids from poly-olefinic fatty acids such that the product is substantially free from poly-olefinic fatty acids and likewise contains only a small quantity of saturated fatty acids.

It is another object of the present invention to provide a novel process of producing oleic acid from polyunsaturated $C_{18}$ acids such that the product is substantially free from the polyunsaturated $C_{18}$ acids and has only a very low content of stearic acid.

The process involves the reaction of polyunsaturated fatty acids with a particular type of hydrogen donor in the presence of a hydrogenation catalyst. No gaseous hydrogen is necessary in the reaction system. The polyunsaturated acids disappear substantially completely while the quantity of saturated acids formed is relatively slight. The process is applicable to higher polyunsaturated fatty acids containing from 8 to 22 carbon atoms. Any polyunsaturated fatty acid in this group may be employed. The fatty acids most commonly found in fatty oils which are suitable for this purpose are linoleic and linolenic acids. The polyolefinic fatty acid may be employed in the form of the free fatty acid or in the form of its common derivatives such as the esters (methyl, ethyl, propyl or butyl esters, and glycerides), the amides, nitriles and salts.

The hydrogen donor which may be employed is a cycloaliphatic hydrocarbon and may be either saturated or unsaturated. Of these donors tetrahydronaphthalene is preferred because of its ready availability. Other cycloaliphatic hydrocarbons such as cyclohexane, dihydronaphthalene, octahydronaphthalene, decahydronaphthalene, cyclohexadiene and the like may be used. In the process these hydrocarbons are dehydrogenated to yield more highly unsaturated materials. In the process some of these hydrocarbons may become aromatic. The dehydrogenated form of the hydrogen donors may be readily removed from the reaction mixture as for example, by filtration or distillation. The hydrogen donor should be employed in a quantity which is sufficient to convert substantially all the polyunsaturated fatty acids to mono-olefinic acids. However, if desired, greater or lesser concentrations of the hydrogen donor may be employed. Where lesser concentrations are employed it may be necessary to subject the reaction mixture to some fractionation process to remove any undesired quantities of polyolefinic acids which may remain under those circumstances.

The process is carried out in the presence of a hydrogenation catalyst. Any hydrogenation catalyst may be employed for this purpose but it is preferred to employ the hydrogenation catalysts which are known to be relatively active. These catalysts include nickel, reduced nickel salts, reduced nickel oxides, nickel catalysts supported on earths, clays, kieselguhr, fats, carbon, and other carriers; palladium, reduced palladium salts, palladium catalysts supported on various carriers, such as carbon, activated carbon, charcoal, alumina, and other carriers; platinum, platinum oxides, reduced platinum oxides, platinum catalysts supported on various carriers; copper, copper chromite, copper oxide and other oxides, including zinc oxide, nickel oxide, chromium oxide, aluminum oxide, molybdenum oxide and other oxides; various sulfides including nickel sulfide, molybdenum sulfide, copper sulfide and other sulfides. Combinations of two or more of the catalysts may also be used. The concentration of the catalyst may be varied within wide limits depending upon the relative rate of reaction which is desired.

The reaction temperature may vary from room temperature (20° C.) to 325° C. At temperatures in excess of 325° C. excessive decarboxylation may occur. The reaction time depends on the particular catalyst employed and the reaction temperature used. The time should be chosen so that the conversion of the poly-olefinic acids to mono-olenic acids is virtually complete.

It is preferred to conduct the reaction in the presence of carbon dioxide. This serves not only to exclude air and prevent oxidation of the catalysts and the reactants but also helps minimize decarboxylation which would be likely to occur particularly at the higher temperatures in the range previously indicated. Other inert gases such as nitrogen or water may be used to prevent oxidation. The employment of an inert atmosphere is not essential where one is not concerned with a small amount of decarboxylation or oxidation. It is preferred to maintain the reaction mixture in a closed system when the reaction is conducted in the presence of an inert gas although this is not absolutely essential.

*Example 1*

A mixture of 35 g. of tetrahydronaphthalene, 15 g. of Raney nickel catalyst and 300 g. of a fatty acid mixture (containing approximately 48% of linoleic acid, 3% of linolenic acid, 6.8% of saturated fatty acids, 3.2% unsaponifiable matter, 2% of rosin and 37% of oleic acid) was charged into a stainless steel autoclave. The air in the autoclave was displaced with carbon dioxide gas and the mixture was agitated and heated to 250° C., then held at that temperature under a pressure of 200 p. s. i. of carbon dioxide, for 4 hours. The autoclave was cooled and the contents were removed. The nickel catalyst was filtered off. The remaining liquid was subjected to steam-distillation to remove naphthalene and a little unreacted tetrahydronaphthalene. The fatty acid product which remained was vacuum-dried. A semi-solid mass having a faint green tinge was obtained.

The fatty acids isolated from the reaction mixture just described contained no linoleic acid and no linolenic acid, about 2% rosin, about 4% of unsaponifiable matter and about 9% of saturated fatty acids. The drop in iodine value corresponded closely to the conversion of linoleic and linolenic acids to oleic acid. The iodine number of the fatty acid mixture before the treatment was 129.0 and after the treatment was 82.2.

*Example 2*

A mixture of 35 g. of tetrahydronaphthalene, 15 g. of commercial Raney nickel catalyst and 300 g. of the same fatty acid mixture used in Example 1 was sealed in a stainless steel autoclave and agitated while being heated at 250° C. under 200 p. s. i. of carbon dioxide pressure for 3 hours. The reaction mixture was dissolved in a petroleum hydrocarbon solvent (Skellysolve C) and filtered to remove the catalyst. The solvent, naphthalene, and any unreacted tetrahydronaphthalene were removed by steam distillation. A portion of the reaction product was distilled after removal of water. Analysis showed that it contained no linolenic acid, no linoleic acid, about 11.5% of saturated fatty acids and about 7.5% of unsaponifiable matter. The drop in iodine number from 129.0 to 90.9 indicated a conversion of linoleic and linolenic acids to oleic acid.

We claim as our invention:

1. Process of producing a mono-olefinic fatty acid containing from 8 to 22 carbon atoms from a poly-olefinic fatty acid which comprises reacting a poly-olefinic fatty acid with a cycloaliphatic hydrocarbon in the presence of a hydrogenation catalyst at a temperature within the range of 20–325° C.

2. Process of producing oleic acid from a poly-olefinic $C_{18}$ fatty acid which comprises reacting the poly-olefinic $C_{18}$ acid with a cycloaliphatic hydrocarbon in the presence of a hydrogenation catalyst at a temperature within the approximate range of 20–325° C.

3. Process according to claim 2 in which the reaction mixture is maintained under an inert atmosphere.

4. Process according to claim 2 in which the reaction mixture is maintained under a carbon dioxide atmosphere.

5. Process of producing oleic acid which comprises reacting a poly-olefinic $C_{18}$ fatty acid with tetrahydronaphthalene in the presence of a nickel hydrogenation catalyst at a temperature of approximately 250° C.

6. Process according to claim 5 in which the catalyst is Raney nickel.

7. Process of producing a mono-olefinic compound from a poly-olefinic compound selected from the group consisting of fatty acids, esters, amides, nitriles and salts thereof, which comprises reacting said poly-olefinic compound with a cycloaliphatic hydrocarbon in the presence of a hydrogenation catalyst at a temperature within the approximate range of 20–325° C.

8. Process according to claim 1 in which the catalyst is Raney nickel.

WILLIAM S. BALDWIN.
DON E. FLOYD.

No references cited.